United States Patent [19]

Halperin et al.

[11] 4,375,583
[45] Mar. 1, 1983

[54] INDIRECTLY ACTIVATABLE TELEPHONE SYSTEM

[75] Inventors: Yitzhak Halperin; Dov Zioni, both of Jerusalem, Israel

[73] Assignee: Institute for Science and Halacha, Jerusalem, Israel

[21] Appl. No.: 252,431

[22] Filed: Apr. 9, 1981

[30] Foreign Application Priority Data

Jan. 3, 1978 [IL] Israel ......................................... 53743

[51] Int. Cl.³ .............................................. H04M 1/26
[52] U.S. Cl. ............................................... 179/90 AD
[58] Field of Search .......... 179/90 AD, 90 D, 90 FW

[56] References Cited

FOREIGN PATENT DOCUMENTS

| 2446569 | 9/1980 | France ............................ 179/90 AD |
| 42-2216672 | 9/1967 | Japan ............................. 179/90 AD |
| 2023966 | 1/1980 | United Kingdom .......... 179/90 AD |
| 394953 | 1/1974 | U.S.S.R. ........................ 179/90 AD |

Primary Examiner—G. Z. Rubinson
Assistant Examiner—L. C. Schroeder
Attorney, Agent, or Firm—Hedman, Casella, Gibson & Costigan

[57] ABSTRACT

There is provided an arrangement for the indirect impulsing of a number dialed on a telephone. The arrangement includes an impulsing mechanism which provides impulses at preset intervals to actuate a circuit completion switch. A shutter is movably mounted with respect to the impulsing mechanism to control the completion of the circuit, and is adapted to be moved upon the dialing of a number. The dial mechanism is detained at its dialed position and is prevented from returning to its normal undialed position. The circuit actuated by the circuit completion switch releases the dial to complete the standard dialing operation for each number dialed.

18 Claims, 10 Drawing Figures

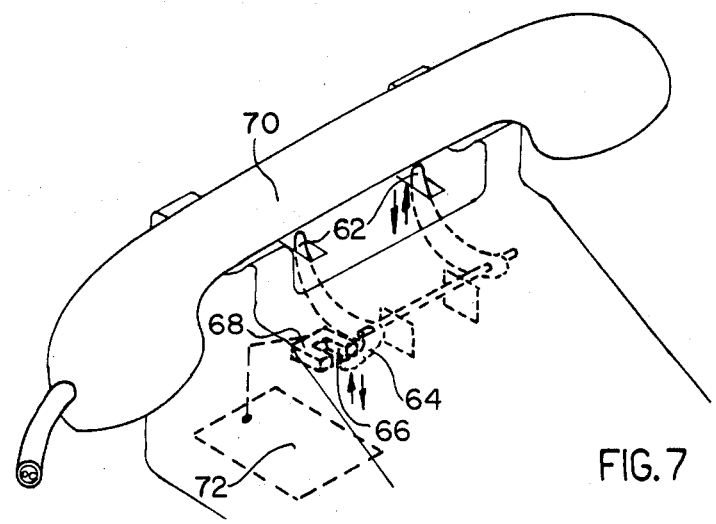
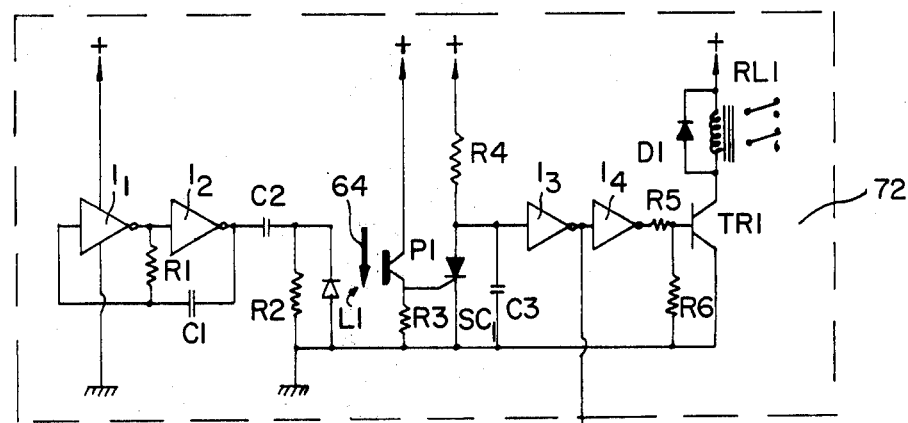
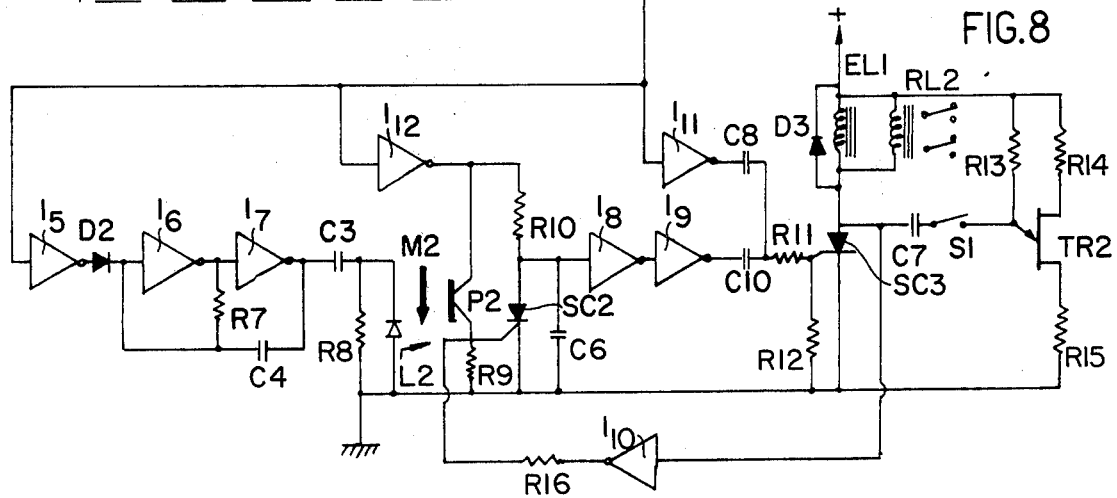
FIG.7
FIG.8

INDIRECTLY ACTIVATABLE TELEPHONE SYSTEM

The present invention relates to an indirectly activatable telephone system and in particular to an arrangement of a dial telephone for the indirect impulsing of numbers dialed. The unique telephone arrangement of the present invention is especially designed to facilitate manual activation thereof on the Jewish Sabbath and Festivals when, according to the Jewish Religious Law, direct activation of telephone systems is generally prohibited.

In order to make or convert regular telephone systems into systems acceptable for use and utilizable on the Sabbath and Festivals in certain required situations, said systems should provide indirect switching and line-impulsing actions after or upon being actuated by a user. Since these indirect actions may be considered as causative, under the principles of the Jewish Religious Law, they fall within the categories of activity which is permitted in certain situations, to be performed on said occasions.

In accordance with the present invention there is therefore provided in a dial telephone, an arrangement for the indirect impulsing of a number dialed, said arrangement comprising:

a. an impulsing means adapted to provide impulses of preset intervals to effect the actuation of a circuit completion means;

b. Shielding means movably mounted with respect to said impulsing means to control the effecting of the completion of said circuit and adapted to be moved upon the dialing of a number;

c. means for detaining the dial mechanism at its dialed position and for preventing the same from returning to its normal undialed position; and d. circuit means actuated by said circuit completion means and adapted to operate said dial mechanism detaining means to thereby release the same and effect the standard dialing operation for each number dialed after the actuation of said circuit completion means.

While the present invention relates to an arrangement for the indirect impulsing of a number dialed, which indirect impulsing can be accomplished by the combination of a dial mechanism and an indirectly activated electrical switching circuit as described hereinafter with reference to the accompanying figures, the electronic circuits utilized therein for effecting said indirect impulsing and, in combination with said arrangement in a complete telephone system, can be of any of the known types and designs of indirectly activated electrical switching circuits.

The invention will now be described in connection with certain preferred embodiments: it will, however, be understood that it is not intended to limit the invention to these particular embodiments. On the contrary, it is intended to cover all alternatives, modifications and equivalent arrangements as may be included within the scope of the invention as defined by the appended claims. Nevertheless, it is believed that embodiments of the invention will be more fully understood from a consideration of the following illustrative description read in conjunction with the accompanying drawings, in which:

FIG. 7 is a schematic illustration of a telephone fitted with an indirectly activating electrical switch;

FIG. 8 is a circuit diagram of the electronic circuit arrangement according to the invention;

Figure 1:
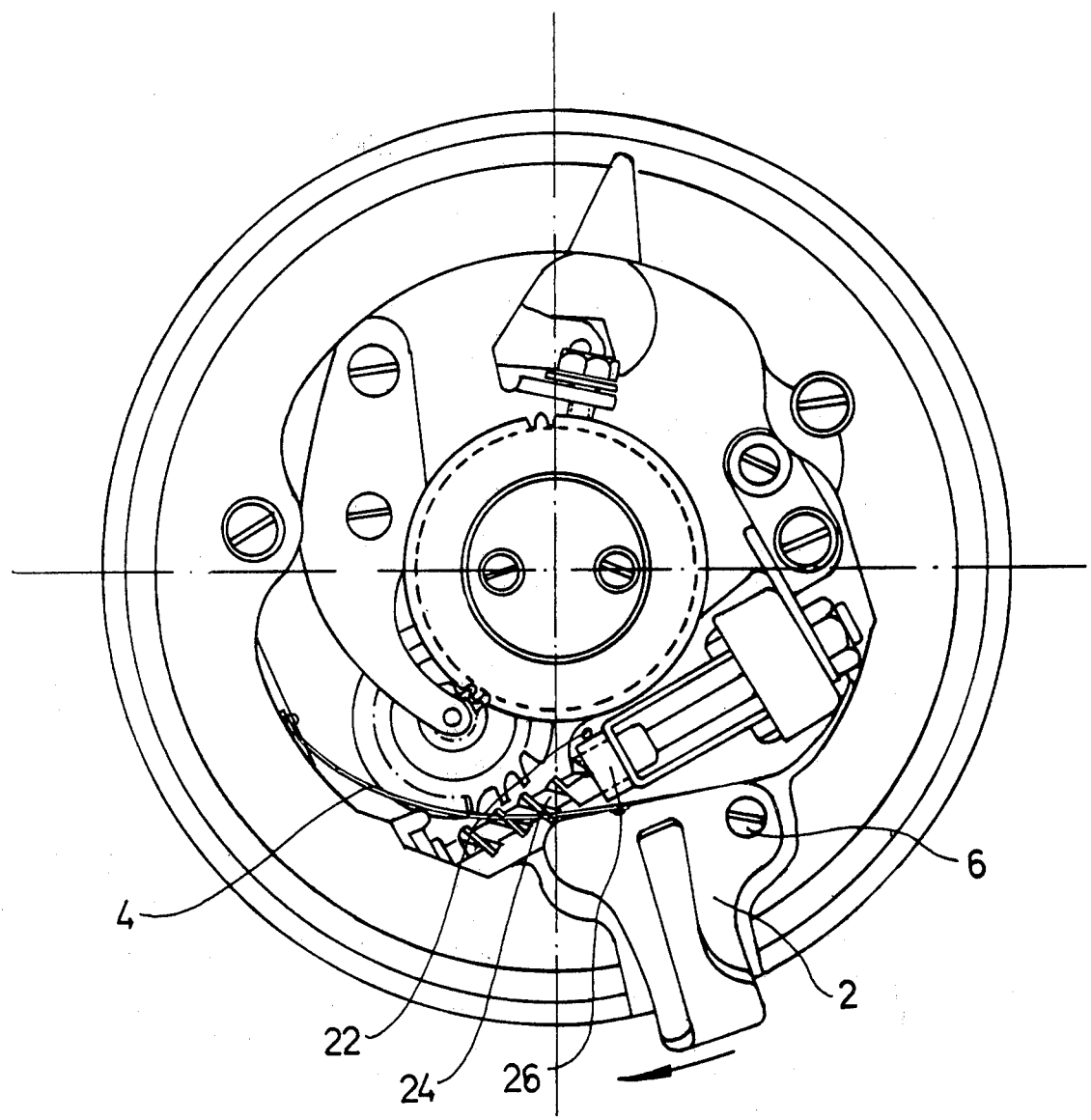
FIG. 1 is a front view of telephone dial modified in accordance with the present invention.
Figure 2:
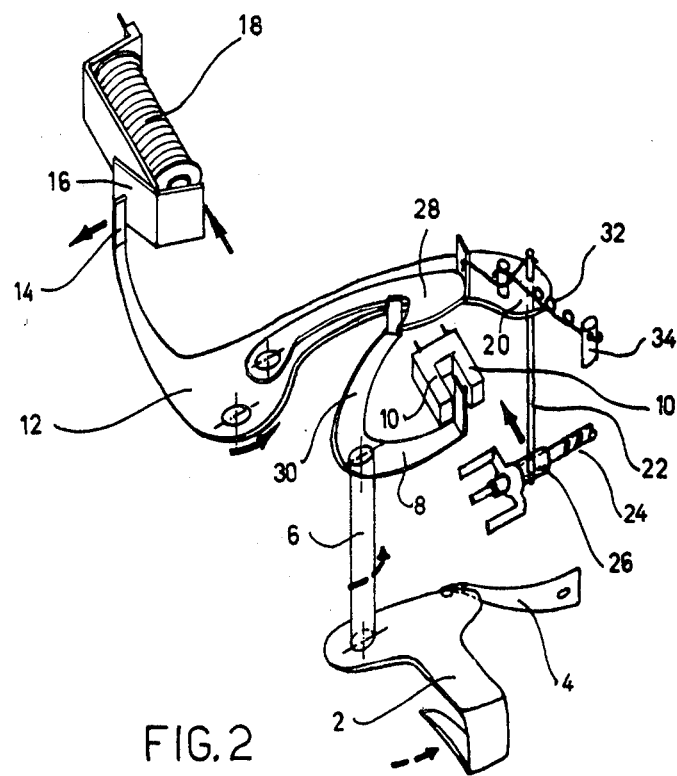
FIG. 2 is an exploded view showing the mechanical and electro-mechanical components which convert a standard telephone dial into an indirectly-activatable dial.
Figure 3:
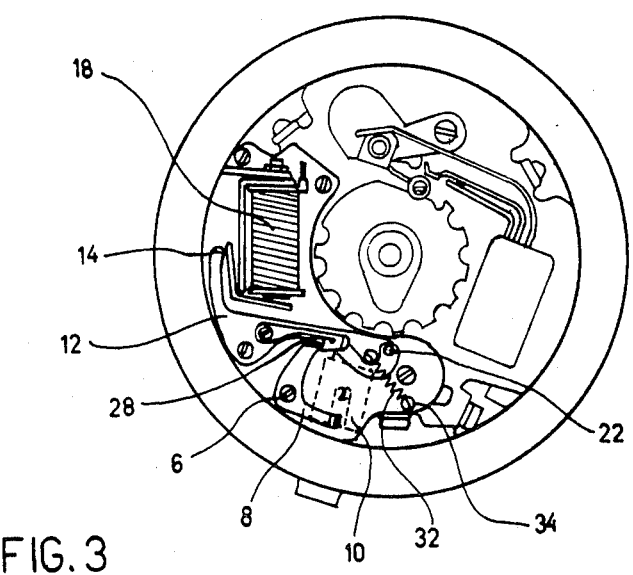
FIG. 3 is a rear view of the telephone dial of FIG. 1 equipped with the components of FIG. 1.

A first embodiment of a dial telephone arrangement for the indirect impulsing of the number dialed according to the invention is shown in FIGS. 1 to 3. For purposes of clarity the following description will refer only to the shown standard dial components which are modified and adapted to function as required by the arrangement according to the invention as well as to the additional mechanical and electrical components which are strategically and operationally affixed in the standard dial so as to function in conjunction with said standard and modified dial components.

As seen in the figures, the attachment of the stationary standard dial finger stop 2 is modified to enable the same to be slightly pivotally displaced in the direction of the arrow against a biasing spring 4 about the axle 6.

The axle 6 is rigidly attached to a shutter 8 (FIGS. 2 and 3) movable in between a light emitting and detecting device 10. On the rear side of the dial (FIG. 3) there is also pivotably mounted a lever plate 12 having a portion 14 situated adjacent an operating arm 16 of an electromagnet 18. To the other end portion 20 of the lever 12 there is affixed a pin 22 traversing the dial and terminating closely adjacent the worm shaft 24. On the worm shaft 24, at the section adapted to be engaged by the pin 22, there is fitted a rubber or the like sleeve 26, which sleeve provides a friction surface to be engaged by the pin. On the lever plate 12 there is pivotably attached a hook 28 adapted to engage a locking arm 30 which arm is an extended portion of the shutter 8. Both the lever plate 12 and the locking arm 30 are biased by a spring 32 anchored to a part 34 of the dial's body.

The operation of the thusly arranged dial is as follows: the spring 32 normally biases the plate lever 12 and in turn, the pin 22 against the friction sleeve 26 which pin 22 detains the worm shaft 24 and consequently, the impulsing mechanism from functioning upon the turning of the standard dialing plate. At the termination of the dialing action, the user bears against the finger stop 2 and displaces the same, against the action of the returning spring 4, to thereby pivot the axle 6 in the direction of the arrow (FIG. 2). As the shutter 8 and the locking arm 30 are rigidly connected to the axle, the shutter is displaced between the light emitting and detecting device 10, to eventually actuate a circuit which is electronically coupled thereto, the details and functions of which circuit will be described hereinafter. The locking arm 30 is also displaced by the movement of the finger stop, and is hooked by the hook 28 and holds the shutter in its displaced position. When now, the electromagnet 18 is energized, its operating arm 16 is rocked and pivots the plate lever. The pivoted plate lever disengages the pin 22 from the sleeve 26 to release the worm shaft 24 and allow the effecting of the dialed impulsing. After a predetermined period of time or a time as detected and controlled by the electronic circuit, the electromagnet is deenergized and the displaced components returned to their initial position to condition the dial for the dialing of the next number.

Figure 4:
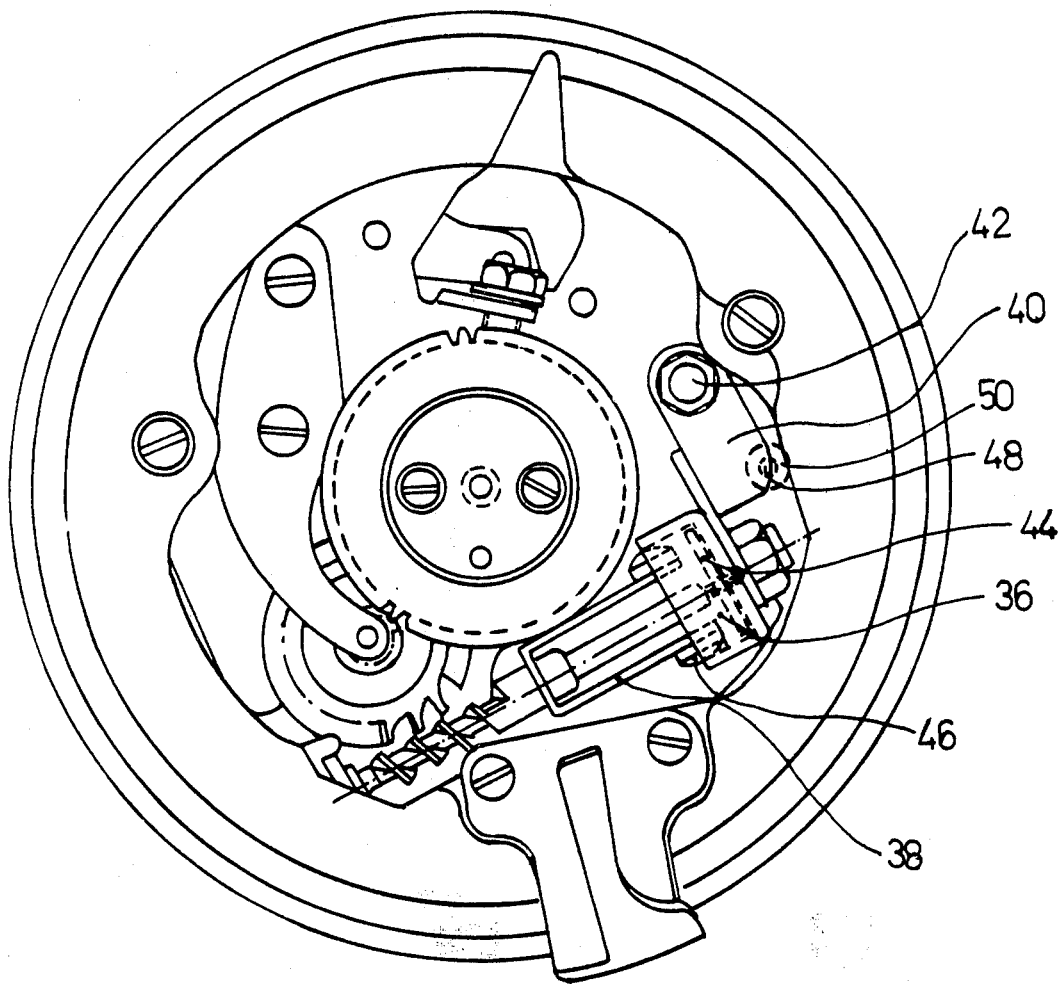
FIG. 4 is a front view of a telephone dial modified in accordance with another embodiment of the present invention.
Figure 5:
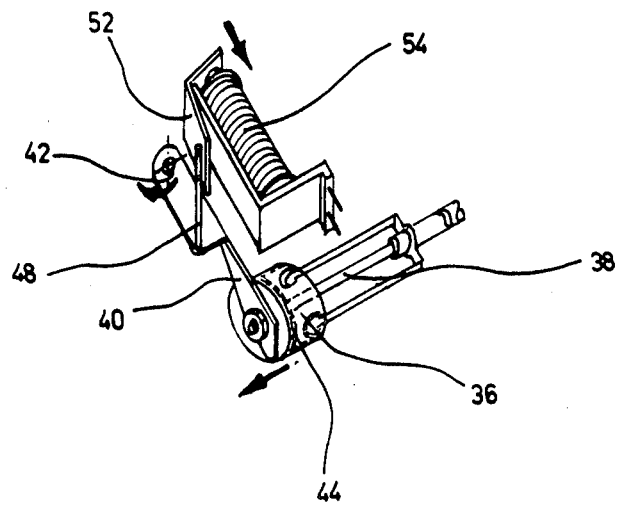
FIG. 5 is an exploded view of the mechanical and electro-mechanical components which convert a standard telephone dial into an indirectly activatable dial.
Figure 6:
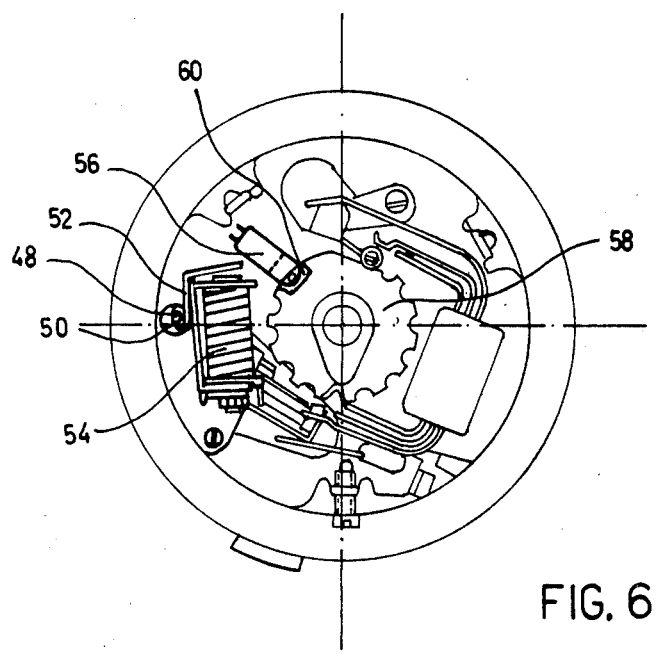
FIG. 6 is a rear view of a telephone dial of FIG. 4 equipped with the components of FIG. 5.

A second possible embodiment of the invention is illustrated in FIGS. 4 to 6 and will now be described. Here again, only the modified and added components of the dial will be described.

As seen, the standard governor cup 36 of the governor 38 is fitted with a spring biased lever 40 pivotably mounted at 42 to the dial's body; the governor cup, is preferably fitted at its inner bottom wall with a friction lining 44 against which lining the heads 46 of the governor 38 are adapted to bear at one position of the cup as determined by the lever 40. As seen in FIGS. 5 and 6, the lever 40 is provided with a pin 48 extending through an aperture 50 made in the dial body and terminating adjacent the rocker 52 of an electromagnet 54. Finally, a light emitting and detecting device 56 is strategically placed in relation to the teethed impulsing cam 58 so that upon the rotating of said cam, any one of said teeth can assume a stationary position in between the light emitting and detecting ports of the device. In accordance with a preferred mode of operation, which will become apparent hereinafter, the standard impulsing cam is slotted at 60 so as not to interrupt or prevent the light emitted at one part of the device from reaching the light detector on the other part thereof.

In operation, the governor's cup 36 bears against the heads 46 of the governor and upon the dialing of a number the impulsing mechanism is detained by said cup at the dialed radial position and can not return and effect the impulsing of the line. Since, however, when a number is dialed the teethed impulsing cam is revolved through a predetermined radial arc corresponding to the specific number which is dialed and one of the impulsing teeth assumes a position in between the two parts of the light emitting and detecting device 56, said teeth constitute a shutter which prevents the light from reaching the detector. As in the embodiment of FIG. 1, the device 56 is electronically coupled to an actuating circuit, which is described hereinafter, which circuit eventually energizes the electromagnet 54 to move the pin 48 and pivot the lever 40. The cup 36 is thus displaced as shown by the arrow and hence the governor is released and allows the worm shaft to revolve and effect the impulsing of the dialed number. Upon the return of the cam 58 to its undialed original position, the slot 60 assumes its position in between the two parts of the device 56 to allow the emitted light to be detected. Consequently, the circuit will deenergize the electromagnet and the cup will bear again against the governor to detain the same from effecting the impulsing of the line upon the dialing of a next number, as controlled by the electronic circuit.

Turning now to FIGS. 7 and 8, there are illustrated a possible embodiment of an indirectly activated telephone unit equipped with an indirectly activated telephone switch and an electronic circuit diagram adapted to operate in conjunction with the dial arrangement according to FIGS. 1 to 6.

As seen in FIG. 7, one of the two intercoupled push button switches 62 which normally exist in a telephone cradle, is fitted with plate member 64 adapted to move in relation with the gap 66 in between the light emitting and detecting device 68. Thus, in accordance with the operational mode of the embodiment shown, when the receiver hand set 70 is placed on the cradle, the push button switches are depressed and the plate member is removed from the gap. The light emitting and detecting device is electronically coupled to a circuit 72 which is only schematically indicated in FIG. 7 but is illustrated in detail in FIG. 8. This indirectly activated switching arrangement is actually only one example of many possible alternatives. Other indirectly activated switching arrangements are described in U.S. Pat. No. 3,980,980 which issued on Sept. 14, 1976 to Zioni and Halperin and U.S. Pat. No. 4,031,435 which issued on June 21, 1977 also to Zioni and Halperin.

Nevertheless, as it can be understood, the invertors $I_1$ and $I_2$ together with the $R_1C_1$ circuit constitute an oscillator for impulsing every several seconds the light emitting diode $L_1$. When the hand set 70 is lifted, the plate member 64 prevents the light pulses from reaching the detector $P_1$. $C_3$ will thus charge through resistor $R_4$ the charging time of which is longer than the intervals between the pulses. When the potential across $C_3$ reaches a predetermined level invertors $I_3$ and $I_4$ invert their state, transistor $TR_1$ conducts and actuates the relay $RL_1$. This relay in turn, connects the standard telephone switches for obtaining a telephone line connection.

When the relay $RL_1$ effects the line connection, the potential at the output of $I_3$ is low and accordingly, the potential at the outputs of invertors $I_{11}$, $I_{12}$ and $I_5$ will be high and the circuits associated with said invertors will be activated.

The oscillating circuit including the invertors $I_6$ and $I_7$ and $R_7C_4$ provides continuous pulses to LED $L_2$, e.g. every one or two seconds. As described with reference to the embodiments of FIGS. 1 to 6, upon the completion of the dialing operation a shutter, represented in FIG. 8 by $M_2$ assumes a position in between the LED $L_2$ and the detector $P_2$ so as to block the light passageway to the detector $P_2$. Consequently capacitor $C_6$ charges via resistor $R_{10}$ every e.g. 3 or 4 seconds. When the potential across the capacitor $C_6$ reaches a predetermined level, the output state of invertors $I_8$ and $I_9$ changes and $SC_3$ is enabled and conducts. The electromagnet $EL_1$ representing the electromagnets in the above embodiments which cause the release of the detained dialing mechanism is energized and the line is impulsed according to the dialed number. Optionally there is also provided a relay $RL_2$ adapted to effect the shorting out of the receiver hand-set circuit upon dialing so as to prevent the telephone dialing noise from being induced in the hand-set. Hence when $SC_3$ conducts, the relay $RL_2$ is also energized and effects the closing of the contacts for shorting out the receiver's hand-set. When now the dialing mechanism returns to its original undialed position, switch $S_1$ is closed, the extinguishing circuit including the unijunction transistor $TR_2$ stops the conduction of $SC_3$ and consequently the electromagnet $EL_1$ as well as the relay $RL_2$ are deenergized.

Upon the conduction of $SC_3$, $SC_2$ is also activated via invertor $I_{10}$ and resistor $R_{16}$ so as to assure the extinguishing of $SC_3$ by the removal of the necessary conducting potential to the input thereof.

When the receiver's hand-set is replaced on its cradle, shutter 64 is removed from the gap 66, the light pulses will reach the detector and the $SC_1$ circuit will discharge the capacitor $C_3$, the invertors $I_3$ and $I_4$ will change their state and stop the conduction of $TR_1$ to disable the relay $RL_1$ and disconnect the telephone line and the activation of the dial's circuits.

Advantageously, when the relay $RL_1$ is energized, there is effected a momentary activation pulse to the dial via $I_{11}$ and $C_8$ and $EL_1$ for resetting the dial mechanism in case said dial was unintentionally moved when the telephone was not in operation.

It should be mentioned that instead of the arrangement wherein upon the return of the dial mechanism to its rest position the switch $S_1$ is closed, said switching action could be dispensed with by establishing the maximum time period required for the dial mechanism to return to its rest position upon its release and adjusting the time constant of the $R_7 C_{13}$ circuit to said maximum time period so that the electromagnet $EL_1$ will be always deenergized.

Finally it is stressed that in accordance with the description and explanations in the aforementioned patents incorporated herein by reference, instead of the light emitting and detecting devices and the circuits which were shown in the above embodiments, other equivalent devices and circuits could just as well be utilized.

Figure 9:
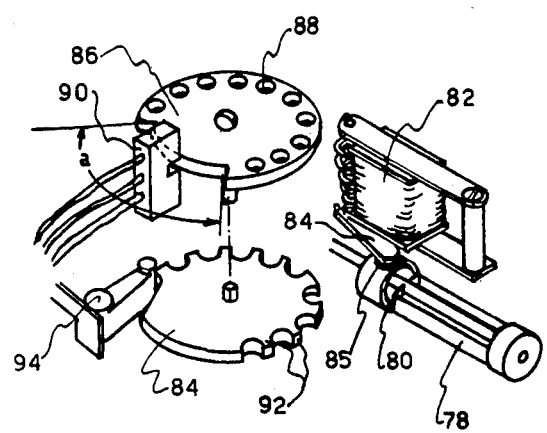
FIG. 9 is an exploded view of a further embodiment of a mechanical and electro-mechanical components which convert a standard telephone dial into an indirectly activatable dial.

In FIG. 9 there is schematically shown an exploded rear view of several components of another modification of a telephone dial mechanism. As seen, on the standard governor 78 of a dial mechanism, there is affixed a cup-shaped, friction surface 80 and immediately thereabove, there is fixedly positioned an electromagnet 82 having a spring-biased armature 84 on the bottom surface of which there is connected a plastic or rubber projection 85. The electromagnet is mounted in such a way that, normally, when the electromagnet is unactivated, the projection 86 presses against the cup-shaped friction surface 80, which does not allow the governor 78 to revolve and, in turn, the dialing plate is locked in its dialled position. When the electromagnet is activated, the armature 84 is attracted toward the core of the electromagnet, the governor is released and the dial can return to its undialled position while effecting the normal dialing impulsing.

As also seen in the figure, on the impulsing cam 84 and spaced apart therefrom, there is mounted a disc 86 having apertures 88 adjacent and along a section of its periphery. The remaining section of the disc $a$ is of a reduced radius. A light emitting and detecting device 90 is mounted on the dial in such a way that the apertured periphery of the disc 86 fits within the gap in between the light emitting and detecting device. The disc 86 is angularly aligned with respect to the impulsing cam 84 so that for every number dialled, the periphery of the disc is temporarily retained in the gap between the light emitting and detecting device, with an unapertured section. Thus, in the retained position of the dial, the emitted light beam can not reach the light detector. Also, the size of the apertures and the disposition of the disc 86 in relation to the impulsing cam 84 is such that the unapertured sections inbetween the apertures will enter the gap and intercept the light beam only after a projection 92 of the impulsing cam 84, corresponding to the dialled number, has already passed the standard impulsing lever 94.

Figure 10:
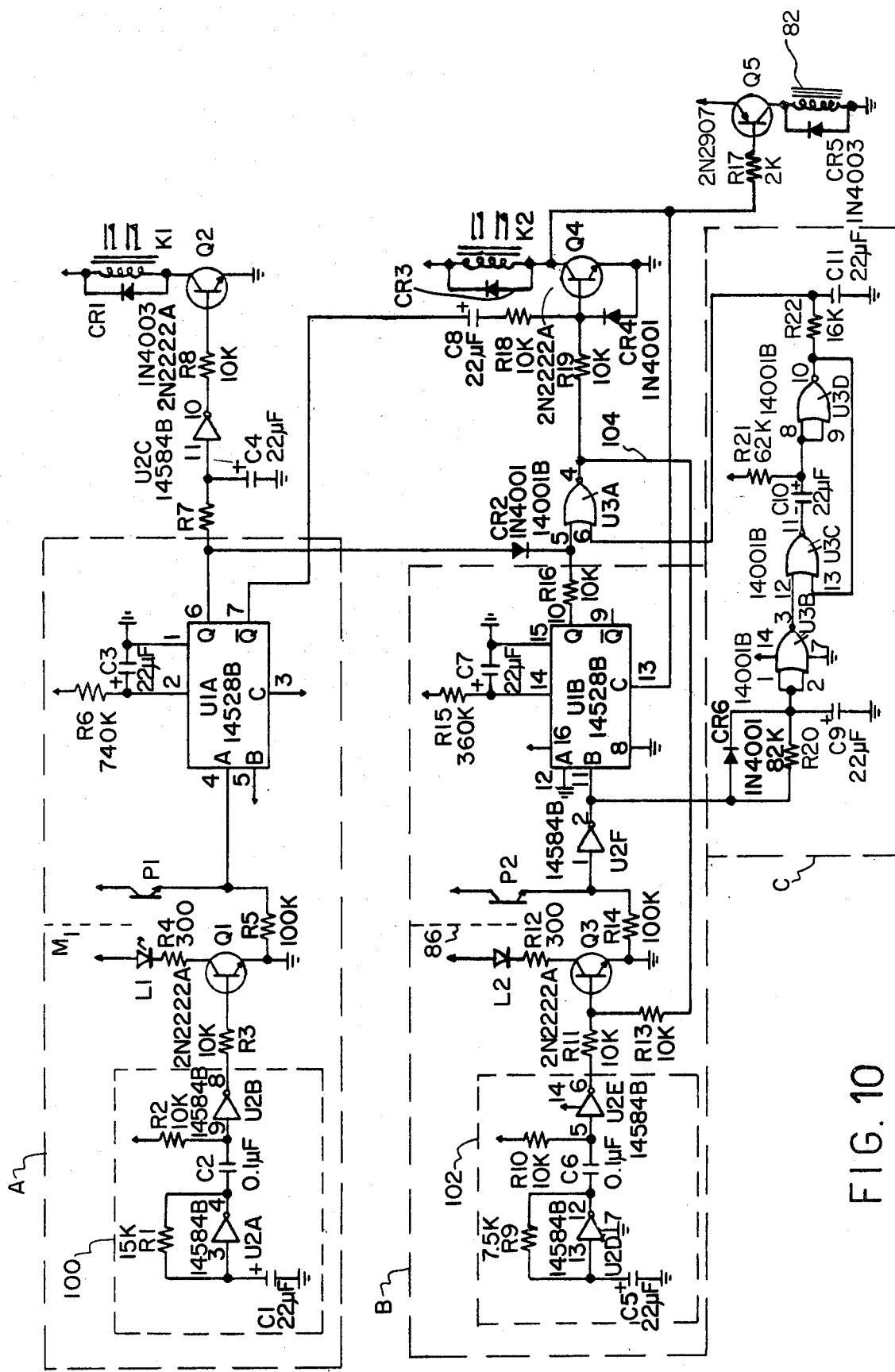
FIG. 10 is a circuit diagram of the electronic circuit arrangement for the embodiment of FIG. 9.

In FIG. 10 there is shown the electronic circuit diagram of the dial telephone arrangement for the indirect impulsing of a number dialled. The circuit inside the hatched box A is the telephone cradle circuit, the circuit inside the hatched box B is the circuit associated with the dialling mechanism and the circuit in hatched box C is the end-of-dialling detection circuit.

Starting with the telephone cradle circuit, an oscillator 100 comprising the inverters U2A and U2B activates the transistor $Q_1$, which in turn, lights up the $L_1$ LED every e.g. 5 seconds for a duration of 10 m/s. When the receiver hand-set is placed on the cradle and presses down the push button switches, the light which is emitted from the LED will reach the photodetector $P_1$ (see FIG. 7). The output terminal 6 of the dual monostable multivibrator U1A, which is adjusted to a time period of 5 seconds, will be high, and consequently, after passing the signal through a delay circuit of resistor $R_7$ and capacitor $C_4$ and through an inverter U2C, $Q_2$ will not be activated and the line relay $K_1$ will not be activated.

On the other hand, if the hand set is lifted off the cradle, shutter M1, which is linked to the push button switched, is interposed between L1 and P1 to interrupt the emitted light. After a period of 5 seconds, U1A which is no longer fed by pulses, changes its state and the potential on terminal 6 switches to low. After a delay of e.g. 1.5 seconds, transistor Q2 is activated and the line relay K1 is actuated.

When the output terminal 6 is switched to low, transistor Q4 is switched into conduction via CR2 and gate U3A. The conduction of transistor Q4 actuate the relay K2, for shorting out the earphone of the telephone hand set, and in turn transistor Q5 is rendered into its conduction state to actuate the electromagnet 82 (see also FIG. 9). The actuation of electromagnet 82 releases the dial to allow the same to return to its undialed position prior of the activation of the line relay K1 which activation is slightly detained by the delay circuit R7, C4.

Referring now to the dialling circuit inside the hatched box B, there is seen an oscillator 102, comprising inverters U2D and U2E, which is adapted to activate the transistor Q3 every e.g. 0.25 seconds for a duration of about 10 m/s. In turn and correspondingly transistor Q3 actuates the light emitting device (LED) L2 of the device 90 shown in FIG. 9. When the dial is in its rest undialled position, the light impulses are uninterrupted and reach the photodetector P2, the dual monostable multivibrator U1B, which is adjusted to a time duration of 1.5 seconds, will provide a high potential on its output terminal 10. Due to the gate U3A, the transistor Q4 and in turn transistor Q5, will not be actuated. Upon the dialling of a number as described hereinabove, the dial along with the disc 86 will be retained in the dialled position wherein an unapertured section of the disc 86 will be interposed between L2 and P2. Hence, the light impulses will not reach P2, and after a time duration of 1.5 seconds the unpulsed U1B multivibrator will switch its state and the potential on its output terminal 10 will become low. Transistor Q4 will be actuated via gate U3A and in turn relay K2 and transistor Q5 will also be actuated. Relay K2 will short out the earphone of the telephone hand set and the transistor Q5 will activate electromagnet 82 to release the retained dial and to allow the same to effect the line impulsing as in a standard telephone.

When transistors Q4 and Q5 are actuated, the potential at the output terminal 4 of the gate U3A is high and thus via the line 104 transistor Q3 is actuated and lights up L2. Also when Q4 and Q5 are actuated, terminal 13 of U1B is switched to low, U1B is thus locked and keeps terminal 10 at its low state.

Turning now to the "end-of-dialling" circuit C, the circuit comprises an input arrangement including a diode D6, a resistor R20, a capacitor C9 and a gate U3B. When the light from L2 does not reach P2, capacitor C9 is charged through diode D6. Only when the light from L2 will reach P2 for a predetermined period of time, C9 will discharge through the resistor R20.

Thus, upon the returning of the dial to its undialled rest position, the disc 86 also revolves and the light beam emitted from L2 passes through the apertures 88 and reaches the photodetector P2. Accordingly, when the disc 86 will assume its position wherein a portion of its section a will be interposed between L2 and P2, i.e. at the end of the dialling cycle, C9 will discharge and a high potential signal will be present at terminal 3 of U3B. The monostable multivibrator composed of U3C and U3D with its delay circuit R22 and C11 will provide a high signal at terminal 6 of U3A. Terminal 4 of U3A will thus become low and the conduction of Q4 and Q5 will stop. Consequently, the electromagnet 82 will be released and the dial mechanism will again be caught to prevent it from impulsing the time should the dial be turned to dial a further number. The delay circuit R22 and C11 assures that the dial mechanism has returned to its rest position before the same is caught again and held by the electromagnet.

While particular embodiments of this invention have been described it will be evident to those skilled in the art that the present invention may be embodied in other specific forms without departing from the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a dial telephone an arrangement for the indirect impulsing of a number dialed, said arrangement comprising:
   a. an impulsing means adapted to provide impulses of preset intervals to effect the actuation of a circuit completion means;
   b. shielding means movably mounted with respect to said impulsing means to control the effecting of the completion of said circuit and adapted to be moved upon the dialing of a number;
   c. means for detaining the dial mechanism at its dialed position and for preventing the same from returning to its normal undialed position; and
   d. circuit means actuated by said circuit completion means and adapted to operate said dial mechanism detaining means to thereby release the same and effect the standard dialing operation for each number dialed after the actuation of said circuit completion means.

2. The arrangement as claimed in claim 1 wherein said impulsing means includes a light emitting device.

3. The arrangement as claimed in claim 2 wherein said circuit completion means includes a photosensitive detector.

4. The arrangement as claimed in claim 1 wherein said circuit means includes an electromagnetically actuatable means adapted to operate said dial mechanism detaining means.

5. The arrangement as claimed in claim 1 wherein the standard finger stop of the telephone dial is formed into a pivotally spring biased displaceable finger stop and said shielding means is coupled thereto, whereby upon effecting the dialing of a number said finger stop and said shielding means are slightly moved to effect the actuation of said circuit completion means.

6. The arrangement as claimed in claim 5 wherein said means for detaining said dial mechanism includes a spring biased lever means adapted to frictionally engage the standard worm shaft of the dial and prevent said shaft from rotating and, in turn, to prevent the standard driving wheel of the dial from rotating and effecting the impulsing of the number dialed.

7. The arrangement as claimed in claim 6 wherein said spring biased lever means comprises a pin affixed to a pivotally mounted lever plate, said pin being adapted to frictionally engage said worm shaft at a substantially right angle to the axis of said shaft.

8. The arrangement as claimed in claim 6 wherein said shielding means further comprises a locking arm and said lever means comprises a pivotally mounted spring biased hook adapted to engage said arm and lock said shielding mean in a shielding position upon the displacement of said finger stop, said hook being adapted to release said arm and thereby to cause said shielding means to return to its normal undisplaced position upon the release of said lever means.

9. The arrangement as claimed in claim 1 wherein said shielding means is constituted by the dial's standard teethed impulse cam and said impulsing means and circuit completion means are positioned on the two opposite sides of said cam along a line traversing the teethed peripheral edge of said impulse cam wherein upon dialing of a number the rotation of said cam positions a corresponding tooth inbetween said impulsing means and circuit completion means to shield said circuit completion means from said impulsing means whereby said circuit means is actuated.

10. The arrangement as claimed in claim 9 wherein in the dial's normal rest position said circuit completion means is unshielded by said cam and said impulsing means and circuit completion means is so situated with respect to said cam that upon the termination of the dialing of a number said impulse cam is detained in a position wherein one of the standard cam teeth shields said circuit completion means from said impulsing means.

11. The arrangement as claimed in claim 9 wherein said means for detaining said dial mechanism is constituted by a spring biased displaceable cup adapted to frictionally engage and detain the standard dial governor mounted on the dials worm shaft.

12. The arrangement as claimed in claim 11 wherein said governor cup is fitted with a friction applying lining adapted to engage and hold the head portions of said governor to thereby detain said worm shaft and, in turn to prevent the standard driving wheel of the dial from rotating and effecting the impulsing of the number dialed.

13. The arrangement as claimed in claim 11 wherein said governor cup is coupled to a lever adapted to operate the governor cup and displace the same to thereby release said detained standard dial governor.

14. The arrangement as claimed in claim 13 wherein the free end of said lever is situated adjacent an electromagnetically actuatable means adapted to operate and displace the lever and wherein said electromagnetically actuatable means consitutes a part of said circuit means.

15. An indirectly activated telephone system comprising in combination a dial telephone arrangement as claimed in claim 1 and an indirectly activated electrical switching circuit as hereinbefore defined, responsible for the activation of said arrangement to enable the impulsing of the telephone line with the dialled numbers.

16. The telephone system as claimed in claim 15 wherein the telephone activation switch, normally operated by the telephone hand-set is an indirectly activated switch as hereinbefore defined.

17. The arrangement as claimed in claims 1 to 3 wherein said means detaining the said dial mechanism is constituted by a spring biased armature of an electromagnet positioned in proximity of a cup-shaped friction surface affixed to the standard governor of a dialling mechanism, and adapted, when the electromagnet is not actuated, to engage said friction surface to thereby prevent the governor and, in turn, the dial mechanism from returning to its rest position after the dialling of a number.

18. The arrangement as claimed in claim 17 wherein said shielding means is constituted by a disc mounted in spaced-apart relationship, on the standard impulsing cam, said disc having apertures corresponding to the cut-outs of the standard impulsing cam and a section of a reduced radius and wherein the periphery of said disc is positioned inbetween said impulsing means and said circuit completion means to selectively either shield said circuit completion means from said impulsing means, or expose it thereto.

* * * * *